US009815147B2

(12) United States Patent
Kiser et al.

(10) Patent No.: US 9,815,147 B2
(45) Date of Patent: Nov. 14, 2017

(54) HIGH STRENGTH NI—CR—MO—W—NB—TI WELDING PRODUCT AND METHOD OF WELDING AND WELD DEPOSIT USING THE SAME

(71) Applicant: Special Metals Corporation, Huntington, WV (US)

(72) Inventors: Samuel D. Kiser, Lenoir, NC (US); Ronald D. Gollihue, Grayson, KY (US); Sarwan K. Mannan, Barboursville, WV (US)

(73) Assignee: SPECIAL METALS CORPORATION, Huntington, WV (US)

( * ) Notice: Subject to any disclaimer, the term of this patent is extended or adjusted under 35 U.S.C. 154(b) by 154 days.

(21) Appl. No.: 14/677,277

(22) Filed: Apr. 2, 2015

(65) Prior Publication Data

US 2015/0306710 A1  Oct. 29, 2015

Related U.S. Application Data

(60) Provisional application No. 61/975,358, filed on Apr. 4, 2014, provisional application No. 61/989,188, filed on May 6, 2014.

(51) Int. Cl.
*B23K 35/30* (2006.01)
*B23K 9/16* (2006.01)
(Continued)

(52) U.S. Cl.
CPC ............ *B23K 35/304* (2013.01); *B23K 9/164* (2013.01); *B23K 35/0261* (2013.01);
(Continued)

(58) Field of Classification Search
CPC .......................... B23K 9/164; B23K 35/0261; B23K 35/0266; B23K 35/30; B23K 35/304; B23K 35/368; C22C 19/055; C22C 19/056
See application file for complete search history.

(56) References Cited

U.S. PATENT DOCUMENTS 2,400,255 A * 5/1946 Pfeil ....................... C23C 18/12
204/156
3,311,972 A * 4/1967 Burke ..................... C22C 19/00
29/526.6
(Continued)

FOREIGN PATENT DOCUMENTS

CA  1336945 C   9/1995
CA  2392754 A1  6/2001
(Continued)

OTHER PUBLICATIONS

625 Inconel® 625 Alloy Brochure; Special Metals Corporation, Aug. 13, 2013; pp. 1-18.
(Continued)

*Primary Examiner* — James Ference
(74) *Attorney, Agent, or Firm* — Burris Law, PLLC

(57) ABSTRACT

A welding filler metal or a welding filler metal product having, in weight percent: 17.0-23.0% chromium, 5.0-12.0% molybdenum, 3.0-11.0% tungsten, 3.0-5.0% niobium, 0-2.0% tantalum, 1.2-3.0% titanium, 0.005-1.50% aluminum, 0.0005-0.100% carbon, <2.0% iron, <5.0% cobalt, and balance nickel wherein the nickel is 56.0-65.0%. A weld deposit formed from the welding filler metal has a minimum yield strength in the as-welded condition of at least 72 ksi (496 MPa). Also, a weld deposit and a method of forming a weld deposit comprising, in weight percent: 17.0-23.0% chromium, 5.0-12.0% molybdenum, 3.0-11.0% tungsten, 3.0-5.0% niobium, 0-2.0% tantalum, 1.2-3.0% titanium, 0.005-1.50% aluminum, 0.0005-0.100% carbon,
(Continued)

<8.0% iron, <5.0% cobalt, and balance nickel wherein the nickel is 56.0-65.0%. The weld deposit has a minimum yield strength in the as-welded condition of at least 72 ksi (496 MPa).

19 Claims, 2 Drawing Sheets

(51) Int. Cl.
    *B23K 35/02* (2006.01)
    *C22C 19/05* (2006.01)
    *B23K 35/368* (2006.01)

(52) U.S. Cl.
    CPC ......... *B23K 35/0266* (2013.01); *B23K 35/30* (2013.01); *B23K 35/368* (2013.01); *C22C 19/055* (2013.01); *C22C 19/056* (2013.01)

(56) References Cited

U.S. PATENT DOCUMENTS

| | | | | |
|---|---|---|---|---|
| 3,479,157 A * | 11/1969 | Stephenson | B23K 9/23 | 420/38 |
| 3,512,963 A * | 5/1970 | Bieber | C22C 1/02 | 420/443 |
| 3,632,319 A * | 1/1972 | Hoppin | B23K 35/304 | 228/194 |
| 3,785,877 A * | 1/1974 | Bailey | C22F 1/10 | 148/556 |
| 3,865,575 A * | 2/1975 | Volin | B22F 9/04 | 420/119 |
| 3,865,581 A * | 2/1975 | Sekino | C22C 19/058 | 420/36 |
| 4,359,352 A * | 11/1982 | Ray | C22C 19/05 | 148/409 |
| 4,409,462 A * | 10/1983 | Jahnke | B23K 15/0093 | 219/121.14 |
| 4,765,956 A * | 8/1988 | Smith | C22C 19/05 | 420/445 |
| 5,328,499 A * | 7/1994 | Poole | C22C 32/0026 | 420/584.1 |
| 5,556,594 A * | 9/1996 | Frank | E21B 17/00 | 148/410 |
| 5,725,693 A * | 3/1998 | Santella | B23K 35/304 | 148/428 |
| 6,177,046 B1 * | 1/2001 | Simkovich | C22C 19/03 | 148/427 |
| 6,242,113 B1 * | 6/2001 | Kiser | B23K 35/304 | 148/428 |
| 6,298,817 B1 * | 10/2001 | Hoeg | C22C 19/05 | 123/188.2 |
| 6,302,649 B1 * | 10/2001 | Mukira | B23K 35/304 | 148/428 |
| 6,315,846 B1 * | 11/2001 | Hibner | C22F 1/10 | 148/675 |
| 6,354,799 B1 * | 3/2002 | Mukira | B23K 35/304 | 219/121.46 |
| 6,478,897 B1 * | 11/2002 | Izumida | C22C 19/055 | 148/428 |
| 6,752,883 B2 * | 6/2004 | Ishida | C22C 19/053 | 148/427 |
| 2002/0166844 A1 * | 11/2002 | Kelly | B23P 6/007 | 219/121.46 |
| 2003/0005981 A1 * | 1/2003 | Ogawa | B23K 35/304 | 148/428 |
| 2004/0076540 A1 * | 4/2004 | Imano | B23K 35/3033 | 420/450 |
| 2004/0079453 A1 * | 4/2004 | Groh | C22C 19/056 | 148/527 |
| 2007/0095441 A1 * | 5/2007 | Jiang | C22C 19/056 | 148/410 |
| 2008/0121629 A1 * | 5/2008 | Kiser | C22C 19/05 | 219/137 WM |
| 2009/0123328 A1 * | 5/2009 | Matsui | B23K 35/0261 | 420/448 |
| 2009/0321405 A1 * | 12/2009 | Baker | B23K 9/0288 | 219/146.23 |
| 2010/0028717 A1 * | 2/2010 | Ishikawa | B23K 15/0046 | 428/684 |
| 2010/0116383 A1 * | 5/2010 | Cloue | C21D 1/74 | 148/675 |
| 2010/0136368 A1 * | 6/2010 | Kiser | B23K 35/304 | 428/680 |
| 2010/0296962 A1 * | 11/2010 | Hasselqvist | C22C 19/056 | 420/445 |
| 2011/0011500 A1 * | 1/2011 | Mannan | C22C 19/055 | 148/677 |
| 2011/0064569 A1 * | 3/2011 | Yamada | C22C 19/055 | 415/200 |
| 2011/0226390 A1 * | 9/2011 | Chen | C22C 19/00 | 148/527 |
| 2012/0118936 A1 * | 5/2012 | Ikeda | B23K 35/0261 | 228/56.3 |
| 2012/0276384 A1 * | 11/2012 | Kawamoto | B23K 35/0261 | 428/385 |
| 2014/0030141 A1 * | 1/2014 | Asteman | C22C 19/055 | 420/582 |
| 2015/0217412 A1 * | 8/2015 | Liu | B23K 35/34 | 428/680 |
| 2015/0232974 A1 * | 8/2015 | Mannan | C22C 19/056 | 148/556 |
| 2015/0306710 A1 * | 10/2015 | Kiser | B23K 35/304 | 403/272 |

FOREIGN PATENT DOCUMENTS

| | | |
|---|---|---|
| GB | 974185 | 11/1964 |
| JP | 2004136301 A | 5/2004 |
| JP | 2013052441 | 3/2013 |

OTHER PUBLICATIONS

Inco-Weld® 725NDUR Filler Metal Brochure; Ni—Cr—Mo Filler Metal; Special Metals Welding Products Company; www.specialmetalswelding.com; at least as early as Apr. 1, 2014; 1 page.

* cited by examiner

Sample I.D.

HIGH STRENGTH NI—CR—MO—W—NB—TI WELDING PRODUCT AND METHOD OF WELDING AND WELD DEPOSIT USING THE SAME

CROSS REFERENCE TO RELATED APPLICATIONS

This application claims priority to U.S. Provisional Application Ser. No. 61/975,358 filed on Apr. 4, 2014 and U.S. Provisional Application Ser. No. 61/989,188 filed on May 6, 2014, both of which are incorporated by reference in their entireties.

BACKGROUND OF THE INVENTION

Field of the Invention

The present invention relates to a high strength Ni—Cr—Mo—W—Nb—Ti welding filler metal and weld deposit and a method of creating a weld deposit using the welding filler metal and, more particularly, to a Ni—Cr—Mo—W—Nb—Ti welding filler metal used to produce a weld deposit having high yield strength in the as-welded condition.

Description of Related Art

During off-shore exploration, development, and production of crude petroleum, there is a need for laying pipe at a rapid rate in order to minimize the time of employment of very expensive "lay barges". This need is met by the concept of "Reeling" long lengths of ID clad pipe welded end-to-end on dry land at facilities called "Spool Bases". These facilities are quite expensive to operate and have multiple stations within the base for preparation, welding, serially sequenced NDE inspection, and coating of long lengths of high-strength ID-clad X-65, X-70, and X-80 pipe. While at sea, joining ends of reels is even more time-sensitive than that required at Spool Bases due to the elevated cost of lay-barge operations. Spool Base operators and lay-barge welders are reluctant to use precipitation-hardened weld metals such as INCO-WELD Filler Metal 725NDUR that require elevated temperature hold times to develop high strength via precipitation hardening because it would slow the process and perhaps have a negative effect on the high strength steel pipes.

Due to the desire to operate these "Spool Bases" most efficiently, gas metal arc welding (GMAW) is used because of the faster rate of welding.

Thus, there is a need for a welding wire that may be used with the gas metal arc welding process that exhibits the same or slightly better corrosion resistance in sour oil and gas applications than the INCONEL® alloy 625 (58.0% min. Ni, 20.0-23.0% Cr, 5.0% max. Fe, 8.0-10.0% Mo, 3.15-4.15% Nb, 0.10% max. C, 0.50% max. Mn, 0.50% max. Si, 0.015% max. P, 0.015% max. S, 0.40% max. Al, 0.40% max. Ti, and 1.0% max. Co, in weight %). This wire is needed to weld ID-clad high-strength pipes made of American Petroleum Industry Specification 5L (API 5L) X-65, X-70, and X-80 steels while providing greater yield strengths in the as-welded condition than each of the base steels being welded. The desirable weld metal would have a yield strength that is approximately 14.5 ksi (100 MPa) greater than the minimum yield strength specified for the pipe that is being welded since qualifications require that transverse two-thickness (2T) 180 degree bends must be performed on the actual pipe being used, and transverse tensile tests must fail in the base metal. Additionally, an overmatch in strength would be desirable to facilitate "Reeling" without the possibility of kinking at or near the welds.

SUMMARY OF THE INVENTION

The present invention is directed to a welding filler metal comprising in weight %: 17.0 to 23.0% chromium, 5.0 to 12.0% molybdenum, 3.0 to 11.0% tungsten, 3.0 to 5.0% niobium, 0 to 2.0% tantalum, 1.2 to 3.0% titanium, 0.005 to 1.50% aluminum, 0.0005 to 0.100% carbon, less than 2.0% iron, less than 5.0% cobalt, and balance nickel wherein the nickel is 56.0 to 65.0%. A weld deposit formed from the welding filler metal has a minimum yield strength in the as-welded condition of at least 72 ksi (496 MPa). The welding filler metal may comprise 64.0% maximum nickel, 22.0% maximum chromium, 10.5% maximum molybdenum, 9.5% maximum tungsten, 4.5% maximum niobium, 1.5% maximum tantalum, 2.5% maximum titanium, 1.25% maximum aluminum, 0.075% maximum carbon, 1.0% maximum iron, and 4.0% maximum cobalt. The welding filler metal may comprise 57.0% minimum nickel, 18.0% minimum chromium, 5.5% minimum molybdenum, 3.5% minimum tungsten, 3.3% minimum niobium, 1.3% minimum titanium, 0.10% minimum aluminum, and 0.005% minimum carbon. The welding filler metal may comprise 62.0% maximum nickel, 21.0% maximum chromium, 9.0% maximum molybdenum, 8.0% maximum tungsten, 4.0% maximum niobium, 1.0% maximum tantalum, 2.0% maximum titanium, 1.00% maximum aluminum, 0.050% maximum carbon, 0.5% maximum iron, and 2.5% maximum cobalt. The welding filler metal may comprise 58.0% minimum nickel, 19.0% minimum chromium, 6.0% minimum molybdenum, 4.0% minimum tungsten, 3.5% minimum niobium, 1.4% minimum titanium, 0.15% minimum aluminum, and 0.010% minimum carbon. The welding filler metal may comprise a minimum of 3.5% niobium+tantalum. The welding filler metal may comprise a maximum of 6.0% niobium+tantalum.

The present invention is also directed to a welding filler metal product having the composition described above for the welding filler metal. A weld deposit formed from the welding filler metal product has a minimum yield strength in the as-welded condition of at least 72 ksi (496 MPa). The welding filler metal product may be in the form of a tubular wire or a flux-cored wire.

The present invention is also directed to a weld deposit comprising: 17.0 to 23.0% chromium, 5.0 to 12.0% molybdenum, 3.0 to 11.0% tungsten, 3.0 to 5.0% niobium, 0 to 2.0% tantalum, 1.2 to 3.0% titanium, 0.005 to 1.50% aluminum, 0.0005 to 0.100% carbon, less than 8.0% iron, less than 5.0% cobalt, and balance nickel wherein the nickel is 56.0 to 65.0%. The weld deposit has a minimum yield strength in the as-welded condition of at least 72 ksi (496 MPa). The weld deposit may comprise 64.0% maximum nickel, 22.0% maximum chromium, 10.5% maximum molybdenum, 9.5% maximum tungsten, 4.5% maximum niobium, 1.5% maximum tantalum, 2.5% maximum titanium, 1.25% maximum aluminum, 0.075% maximum carbon, 7.0% maximum iron, and 4.0% maximum cobalt. The weld deposit may comprise 57.0% minimum nickel, 18.0% minimum chromium, 5.5% minimum molybdenum, 3.3% minimum tungsten, 3.3% minimum niobium, 1.3% minimum titanium, 0.10% minimum aluminum, and 0.005% minimum carbon. The weld deposit may comprise 62.0% maximum nickel, 21.0% maximum chromium, 9.0% maximum molybdenum, 8.0% maximum tungsten, 4.0% maximum niobium, 1.0% maximum tantalum, 2.0% maximum titanium, 1.00% maximum aluminum, 0.050% maximum carbon, 5.0% maximum iron, and 2.5% maximum cobalt. The weld deposit may comprise 58.0% minimum nickel, 19.0% minimum chromium, 6.0% minimum molybdenum, 4.0% minimum tungsten, 3.5% minimum niobium, 1.4% minimum titanium, 0.15% minimum aluminum, and 0.010% carbon. The weld deposit may comprise a minimum of 3.5% niobium+tantalum. The weld deposit may comprise a maximum of 6.0% niobium+tantalum.

The weld deposit may have a microstructure including finely dispersed second phase particles. The second phase particles may be less than 5 µm. Elongation of the weld deposit may be at least 20%. Toughness of the weld deposit may be at least 50 J at −50° F.

The present invention is also directed to a method of producing a weld deposit comprising providing a welding filler metal or welding filler metal product as described above, melting and cooling the welding filler metal or welding filler metal product to create a weld deposit; and limiting iron dilution of the weld deposit during melting and cooling such that the as-welded weld deposit contains less than 8% iron, wherein the weld deposit has a minimum yield strength in the as-welded condition of at least 72 ksi (496 MPa). The melting and cooling of the welding filler metal or welding filler metal product may be accomplished by gas metal arc welding (GMAW) or gas tungsten arc welding (GTAW). The welding filler metal or welding filler metal product may be melted and cooled in a narrow groove joint between two steel components wherein the narrow groove joint has an included angle of 2-5 degrees. The steel components may be clad on at least one side with a nickel alloy.

The present invention is also directed to a weldment comprising at least two high-strength steel components having a minimum yield strength of 65 ksi (448 MPa) connected by a weld deposit having the composition described above and having a minimum yield strength in the as-welded condition of at least 72 ksi (496 MPa).

BRIEF DESCRIPTION OF THE DRAWING(S)

DESCRIPTION OF THE INVENTION

Figure 1:
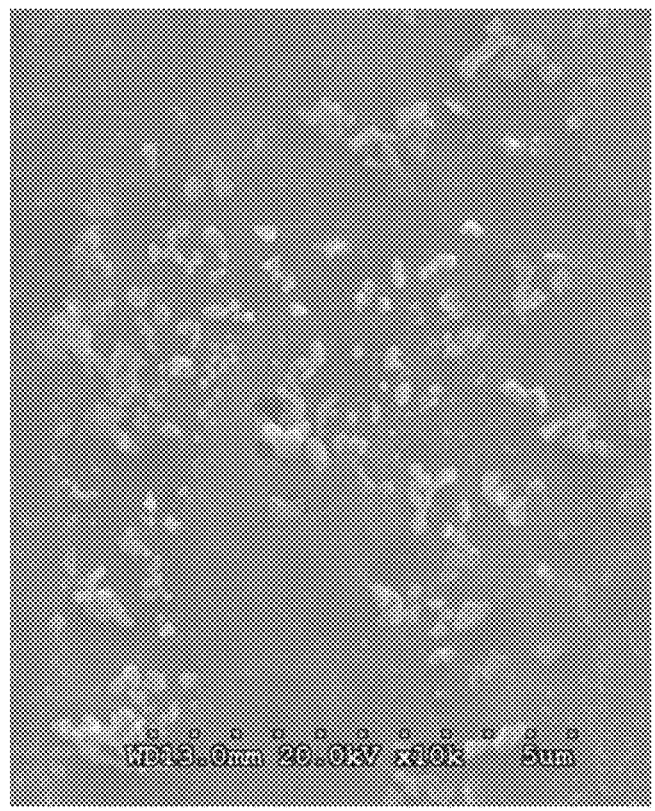
FIG. 1 is a scanning electron micrograph of the microstructure of one embodiment of the inventive weld deposit showing small second phase particles.

All yield strengths cited herein were measured at a 0.2% offset and all compositions are given in weight percent.

The present invention is directed to a welding filler metal and weld deposit and a method of using the welding filler metal to achieve a weld deposit that exhibits good corrosion resistance, preferably the same or slightly better than INCONEL® alloy 625 (58.0% min. Ni, 20.0-23.0% Cr, 5.0% max. Fe, 8.0-10.0% Mo, 3.15-4.15% Nb, 0.10% max. C, 0.50% max. Mn, 0.50% max. Si, 0.015% max. P, 0.015% max. S, 0.40% max. Al, 0.40% max. Ti, and 1.0% max. Co) in sour oil and gas applications yet provides greater yield strengths in the as-welded condition than each of the base steels being welded, American Petroleum Industry Specification 5L (API 5L) X-65, X-70, and X-80 steels. The weld deposit preferably has an as-welded yield strength that is at least 14.5 ksi (100 MPa) greater than the minimum yield strength specified for the pipe that is being welded.

For X-65 pipe having a required minimum yield strength of 65 ksi (448 MPa), the typical yield strength is around 72-74 ksi (496-510 MPa) and the highest expected yield strength is around 75-77 ksi (517-531 MPa). Likewise, for X-70 pipe having a required minimum yield strength of 70 ksi (483 MPa), the typical yield strength is 75-77 ksi (517-531 MPa) while the highest expected yield strength is around 80-82 ksi (552-565 MPa), and for X-80 pipe having a required minimum yield strength of 80 ksi (552 MPa), the typical yield strength is around 84-86 ksi (579-593 MPa) with the maximum expected yield strength of about 88-90 ksi (607-621 MPa). Thus, in order to have a weld deposit with a yield strength at least 14.5 ksi (100 MPa) greater than the minimum yield strength specified for the pipe that is being welded, a weld deposit yield strength of 79.8 ksi (550 MPa) minimum, 84.8 ksi (585 MPa) minimum, and 94.5 ksi minimum (652 MPa) is need for X-65, X-70, and X-80 pipe, respectively.

Table 1, shows the typical and expected maximum yield strengths of the X-65, X-70, and X-80 pipe, the typical minimum yield strengths required for weld deposits in these pipes, the desired minimum weld strengths of the inventive weld deposit in these pipes, the yield strengths of weld deposits of seven commercially available welding filler metals, some of which have been used for X-65 and lower strength pipe, and the yield strengths for five weld deposits made according to the present invention. Table 2 shows the compositions for the welding filler metals listed in Table 1. All seven of the commercially available welding filler metals, including precipitation hardening alloy INCOWELD® 725NDUR, suffer low, inconsistent, as-welded strength and none of the weld deposits made using the seven commercially available welding filler metals have sufficient yield strength to consistently meet the requirements of the higher strength pipe. Other precipitation-hardening, corrosion resistant welding wires are available, but they require time-consuming post weld heat treatment (pwht) to achieve sufficient strength which makes them unattractive.

TABLE 1

Mechanical Properties of Pipes and Weld deposits

| Alloy | Minimum Required Yield Strength (ksi)/(MPa) | Typical Yield Strength (ksi)/ (MPa) | Expected Maximum Yield Strength (ksi)/ (MPa) | Typical Weld Deposit Minimum Yield Strength (ksi)/ (MPa) | Charpy V-Notch Toughness (ft-lb.)/(J) | Desired Inventive Weld Deposit Minimum Yield Strength (ksi)/ (MPa) |
|---|---|---|---|---|---|---|
| Pipe | | | | | | |
| X-65 | 65/448 | 72-74/ 496-510 | 75-77/ 517-531 | 78-82/ 538-565 Required | | 79.8/550 |
| X-70 | 70/483 | 75-77/ 517-531 | 80-82/ 552-565 | 83-85/ 573-586 Required | | 84.8/585 |
| X-80 | 80/552 | 84-86/ 579-593 | 88-90/ 607-621 | 90-93/ 621-641 Required | | 94.5/652 |
| Prior Art Welding Filler Metals | | | | | | |
| INCO-WELD® C-276 | | | | 60-70/ 414-483 | 30-50/ 41-68 | |
| INCONEL® Alloy 625 | | | | 65-75/ 448-517 | 25-45/ 34-61 | |
| INCONEL® Alloy 622 | | | | 65-75/ 448-517 | 30-45/ 41-61 | |
| INCO-WELD® 686CPT® | | | | 65-75/ 448-517 | 20-50/ 27-68 | |
| Phyweld NCW | | | | 65-75/ 448-517 | 20-50/ 27-68 | |
| Alloy 59 | | | | 65-75/ 448-517 | 20-50/ 27-68 | |
| INCO-WELD® 725NDUR | | | | 65-76/ 448-524 | 30-50/ 41-68 | |
| 230-W® | | | | 68-78/ 469-538 | | |
| Inventive Welding Filler Metals | | | | | | |
| HV1652 | | | | 85.5/590 | | |
| HV1653 | | | | 84.4/582 | | |
| HV1654 | | | | 86.6/597 | | |
| HV1655 | | | | 92.4/637 | | |
| HV1708 | | | | >86.7/>598 | 137/186 | |

TABLE 2

Nominal and Actual Chemical Compositions of the Welding Filler Metals Shown in Table 1

| Alloy | Ni | Cr | Fe | Nb | Ti | W | Mo | Al | C |
|---|---|---|---|---|---|---|---|---|---|
| Nominal Compositions - Prior Art Welding Filler Metals | | | | | | | | | |
| INCO-WELD® C-276 | balance | 16 | 5 | 0.02 | | 4 | 16 | | 0.02 |
| INCONEL® Alloy 625 | balance | 21 | 1 | 3.5 | 0.25 | 0.01 | 9 | 0.3 | 0.02 |
| INCONEL® Alloy 622 | balance | 21 | 2 | 0.01 | | 3 | 14 | | 0.015 |
| INCO-WELD® 686CPT® | balance | 21 | 1 | 0.01 | 0.25 | 4 | 16 | 0.5 | 0.01 |
| Phyweld NCW | balance | 22 | 2 | 0.2 | 0.4 | 3 | 10 | 0.4 | 0.03 |
| Alloy 59 | balance | 23 | 1.5 | | | | 16 | 0.3 | 0.01 |
| INCO-WELD® 725NDUR | 57 | 21.5 | balance | 3.5 | 1.5 | | 8.5 | 0.35 | 0.03 |
| 230-W® | Balance | 22.0 | 3 | | | 14 | 2 | 0.35 | 0.10 |
| Actual Compositions - Inventive Filler Metals | | | | | | | | | |
| HV1652 | 64.3 | 20.6 | <1.0 | 3.7 | 1.5 | 3.2 | 6.2 | 0.30 | 0.01 |
| HV1653 | 62.2 | 20.7 | <1.0 | 3.6 | 1.5 | 3.3 | 8.3 | 0.31 | 0.01 |
| HV1654 | 61.7 | 20.5 | <1.0 | 3.8 | 1.6 | 5.8 | 6.2 | 0.29 | 0.01 |

TABLE 2-continued

Nominal and Actual Chemical Compositions of the Welding Filler Metals Shown in Table 1

| Alloy | Ni | Cr | Fe | Nb | Ti | W | Mo | Al | C |
|---|---|---|---|---|---|---|---|---|---|
| HV1655 | 58.8 | 20.4 | <1.0 | 3.8 | 1.5 | 6.9 | 6.9 | 0.27 | 0.01 |
| HV1708 | 58.8 | 20.2 | <1.0 | 3.7 | 1.5 | 7.9 | 7.2 | 0.20 | 0.01 |

The present invention is directed to a welding filler metal comprising: 17.0 to 23.0% chromium, 5.0 to 12.0% molybdenum, 3.0 to 11.0% tungsten, 3.0 to 5.0% niobium, 0 to 2.0% tantalum, 1.2 to 3.0% titanium, 0.005 to 1.50% aluminum, 0.0005 to 0.100% carbon, less than 2.0% iron, less than 5.0% cobalt, and balance nickel wherein the nickel is 56.0 to 65.0%, preferably comprising 19.0 to 21.0% chromium, 6.0 to 9.0% molybdenum, 4.0 to 8.0% tungsten, 3.5 to 4.0% niobium, 0 to 1.0% tantalum, 1.4 to 2.0% titanium, 0.20 to 1.00% aluminum, 0.005 to 0.050% carbon, less than 0.5% iron, less than 2.5% cobalt, and balance nickel, wherein the nickel is 58.0 to 62.0%.

Nickel (Ni)—

Nickel is beneficial for providing a ductile, corrosion resistant matrix capable of dissolving the above amounts of solute atoms. To achieve the desired effect, the nickel content is controlled to be at least 56.0%, preferably at least 57.0%, and more preferably 58.0%. However, excessive amounts of nickel have a detrimental effect on limiting the amount of strengthening and corrosion-resisting elements. Accordingly, the nickel content is controlled to be at most 65.0%, preferably at most 64.0%, and more preferably at most 62.0%.

Chromium (Cr)—

Chromium is beneficial for corrosion resistance and some strengthening. To achieve the desired effect, the chromium content is controlled to be at least 17.0%, preferably at least 18.0%, and more preferably at least 19.0%. However, excessive amounts of chromium have a detrimental effect on CTE and ductility. Accordingly, the chromium content is controlled to be at most 23.0%, preferably at most 22.0%, and more preferably at most 21.0%.

Aluminum (Al)—

Aluminum is beneficial for deoxidizing the filler metal and providing gamma prime strengthening. To achieve the desired effect, the aluminum content is controlled to be at least 0.005%, preferably at least 0.10%, more preferably at least 0.15%, and even more preferably at least 0.20%. However, excessive amounts of aluminum have a detrimental effect on hot-cracking resistance and surface cleanliness. Accordingly, the aluminum content is controlled to be at most 1.50%, preferably at most 1.25%, and more preferably at most 1.00%.

Niobium (Nb)—

Niobium is beneficial for strengthening by precipitation of second phase particles. To achieve the desired second phases, the niobium content is controlled to be at least 3.0%, preferably at least 3.3%, and more preferably at least 3.5%. However, too much niobium can increase hot-cracking sensitivity. Accordingly, the niobium content is controlled to 5.0% maximum, preferably 4.5% maximum, and more preferably 4.0% maximum.

Molybdenum (Mo)—

Molybdenum is beneficial for corrosion resistance and solid solution matrix strengthening. It also forms Mu phase which strengthens the welding filler metal. To achieve the desired effect, the molybdenum content is controlled to be at least 5.0%, preferably at least 5.5%, and more preferably at least 6.0%. However, higher amounts of molybdenum can complicate hot working of the welding filler metal during production. Accordingly, the molybdenum content is controlled to at most 12.0%, preferably at most 10.5%, and more preferably at most 9.0%.

Tungsten (W)—

Tungsten is beneficial for strengthening and corrosion resistance. To achieve the desired effect, the tungsten content is controlled to be at least 3.0%, preferably at least 3.5%, and more preferably at least 4.0%, and at most 11.0%, preferably at most 9.5%, and more preferably at most 8.0%.

Tantalum (Ta)—

Tantalum is beneficial for strengthening, like Nb, and may be adjusted in relationship to the Nb for control of microstructural phases. Under commercial conditions, tantalum would be expected to be present in an amount of at least 1 ppm even if not intentionally added. Tantalum should not exceed 2.0%, preferably should not exceed 1.5%, and more preferably should not exceed 1.0%.

Niobium+Tantalum (Nb+Ta)—

Niobium and tantalum are both second phase formers and strengtheners and, thus, may be adjusted for control of second phases; however, the total is at least 3.0%, preferably at least 3.3%, and more preferably at least 3.5% and at most 7.0%, preferably at most 6.0%, and preferably at most 5.0%.

Titanium (Ti)—

Titanium is beneficial for porosity control and gamma prime formation as well as second phase formation. To achieve the desired effect, the titanium content is controlled to be at least 1.2%, preferably at least 1.3%, and more preferably at least 1.4%. However, too much titanium causes the formation of eta phase. Accordingly, the titanium content is controlled to at most 3.0%, preferably at most 2.5%, and more preferably at most 2.0%.

Carbon (C)—

Carbon in conjunction with Ti and Nb is beneficial for grain size control of the as-welded weld deposit as well as second phase formation. To achieve the desired effect, the carbon content is controlled to be at least 0.0005%, preferably at least 0.005%, and more preferably at least 0.010% and at most 0.100%, preferably at most 0.075, and more preferably at most 0.050%.

Cobalt (Co)—

Cobalt is a matrix-strengthening element that contributes in a measurable way to increase hardness and higher tensile and yield strengths. However, because of cost, it is desirable to limit its addition to 5.0% maximum, preferably to 4.0% maximum and, more preferably to 2.5% maximum.

Iron (Fe)—

Iron in the welding filler metal should be controlled to less than 2.0%, preferably to less than 1.0%, and more preferably to less than 0.5% in order to assist in maintaining low iron in the weld deposit. Excessive iron in the weld deposit decreases the yield strength in the as-welded condition.

Silicon (Si)—

Silicon is helpful for improving puddle fluidity in small amounts, but can lead to increased sensitivity to hot-cracking or solidification cracking at higher levels. Accordingly, the silicon content is controlled to at most 0.75%, preferably 0.50% or less, more preferably 0.25% or less, and most preferably 0.15% or less.

Manganese (Mn)—

Manganese should be at most 3.0%, preferably 2.0% or less, more preferably 1.0% or less, and most preferably 0.20% or less to discourage $M_{23}C_6$ formation.

Sulfur (S), Phosphorous (P), Calcium (Ca), and Magnesium (Mg)—

Sulfur and phosphorous may be present as impurities and should be limited as follows: sulfur less than 0.002%, phosphorous less than 0.010%, and more preferably less than 0.005%, while calcium and magnesium may be added and should be controlled to calcium less than 0.006%, and more preferably less than 0.005%, and magnesium less than 0.020%, and more preferably less than 0.010%.

Five welding filler metals having the inventive composition were produced. The compositions of these welding filler metals are show in Table 2. Duplicate mechanical property testing was performed on four of the inventive welding deposits in the as-welded condition using longitudinal all-weld-metal specimens made using gas tungsten arc welding (GTAW). Two conditions were tested. The first having 15-20% iron dilution of the welding filler metal and the second having less than 5% iron dilution of the welding filler metal. The results are shown in Tables 3 and 4, a comparison of which shows that high iron dilution has a detrimental effect on yield strength.

Table 5a shows Charpy V notch impact properties of a fifth inventive welding filler metal in the as-welded condition with less than 5% iron dilution and can be compared to the values given in Table 5b when the weld contains 9.4% Fe.

TABLE 3

Mechanical Properties of As-Welded Longitudinal All-Weld-Metal Specimens Having 15-20% Iron Dilution

| | 0.2% Yield Strength | | Ultimate Tensile Strength | | Elongation | Reduction of Area |
|---|---|---|---|---|---|---|
| | ksi | MPa | ksi | MPa | (%) | (%) |
| HV1652 | 65.3 | 450 | 111.7 | 770 | 27.6 | 30.1 |
| | 64.7 | 446 | 109.7 | 756 | 27.9 | 36.7 |
| HV1653 | 67.3 | 464 | 112.7 | 777 | 42.1 | 46.3 |
| | 65.4 | 451 | 108.2 | 746 | 25.6 | 31.0 |
| HV1654 | 70.9 | 489 | 114.4 | 789 | 28.3 | 32.9 |
| | 68.4 | 472 | 115.7 | 798 | 32.9 | 31.8 |
| HV1655 | 70.7 | 488 | 115.3 | 795 | 25.5 | 29.2 |
| | 70.0 | 483 | 119.3 | 823 | 32.6 | 36.7 |

TABLE 4

Mechanical Properties of As-Welded Longitudinal All-Weld-Metal Specimens Having Less Than 5% Iron Dilution

| | 0.2% Yield Strength | | Ultimate Tensile Strength | | Elongation |
|---|---|---|---|---|---|
| | ksi | MPa | ksi | MPa | (%) |
| HV1652 | 85.6 | 590 | 129 | 889 | 45.4 |
| | 85.4 | 589 | 128 | 883 | 41.1 |
| HV1653 | 85.9 | 592 | 125 | 862 | 33.4 |
| | 82.9 | 572 | 127 | 876 | 41.0 |
| HV1654 | 87.7 | 605 | 130 | 896 | 43.0 |
| | 85.5 | 590 | 129 | 889 | 43.2 |
| HV1655 | 92.9 | 641 | 134 | 924 | 33.0 |
| | 91.8 | 633 | 129 | 889 | 31.3 |

TABLE 5a

−50° F. Weld Center Impact Values for Inventive Welding Filler Metal HV1708 GTA Welded to INCONEL ® 600 Base Material with Weld Deposit Fe = 1.5% Fe*

| Test # | Ft.-Lb. | Joules | Joules/cm$^2$ | Lat. Exp | % Shear | Broke (Y/N) |
|---|---|---|---|---|---|---|
| 1 | 152.8 | 207.2 | 259.0 | 0.094 | 85 | Y |
| 2 | 134.1 | 181.8 | 227.3 | 0.089 | 85 | Y |
| 3 | 124.2 | 168.4 | 210.5 | 0.078 | 85 | Y |
| Average | 137.0 | 185.8 | 232.3 | | | |

*determination made using Niton XL3T - Xray Fluorescence Analyzer

TABLE 5b

−50° F. Weld Center Impact Values for Inventive Welding Filler Metal HV1708 GTA Welded to INCONEL ® alloy 625 I.D. Clad X-65 Steel Pipe with Weld Deposit Fe = 9.4% Fe

| Test # | Ft.-Lb. | Joules | Joules/cm$^2$ | Lat. Exp | % Shear |
|---|---|---|---|---|---|
| 1 | 46.6 | 63.2 | 79.0 | 0.022 | 20 |
| 2 | 36.9 | 50.0 | 62.5 | 0.021 | 20 |
| 3 | 44.8 | 60.7 | 75.9 | 0.029 | 20 |
| Average | 42.8 | 58.0 | 72.5 | | |

As can be seen from the mechanical properties in Tables 3, 4, 5a, and 5b, when the inventive welding filler metals are diluted with 15%-20% Fe, the yield strength is about 20 ksi (138 MPa) lower than when the iron dilution is less than 5%. Also, when the inventive welding filler metals are diluted with more than 9% Fe, the impact properties are considerably lower than when dilution is controlled to less than 5% Fe. Thus, the Fe in the weld deposit should be kept below 8.0%, preferably below 7.0%, and more preferably below 5.0%. Iron dilution can be controlled to low values by maintaining low heat input which in turn maintains second phase particle fineness while promoting higher yield and impact strengths. For highest values of yield and impact strengths, the heat input of welding should be less than 50 kJ/in., preferably less than 45 kJ/in., and more preferably less than 40 kJ/in. At the same time, lower heat input usually calls for more weld beads or passes which in turn increases the strengthening of previous beads or passes with the heat input of subsequent beads or passes.

The weld deposit has a yield strength of at least 72 ksi (496 MPa), preferably at least 78 ksi (538 MPa), and more preferably at least 80 ksi (552 MPa), elongation of at least 20%, preferably at least 25%, and more preferably at least 30%, toughness of at least 50 J at −50° F., preferably at least 70 J at −50° F., and more preferably at least 100 J at −50° F., and hardness between 200-400 HV.

The microstructure of the weld deposit contains second phase particles in the interdendritic areas. The second phase particles are shown in FIG. 1 which is a scanning electron micrograph of the microstructure of a weld deposit made using inventive welding filler metal HV 1655. The second phase particles are principally less than 5 μm and may be less than 0.5 μm.

The second phase particles are precipitated upon solidification and cool-down into a matrix that is stiffened with tungsten and molybdenum, and this combination, coupled with the strengthening effect of multiple weld beads or passes, provides the unexpectedly high yield strength. The fineness and density of the particles contribute to the extremely high impact toughness and high elongation of the weld deposit. Such a combination is unexpected in a very high strength nickel alloy weld deposit since as strength is increased in prior art weld deposits, toughness and ductility are generally decreased.

As can be seen for the prior art welding filler metals that do not contain substantial amounts of niobium and titanium (INCO-WELD® C-276, INCONEL® Alloy 622, INCO-WELD 686CPT®, Phyweld NCW, Alloy 59), yield strengths of the weld deposit in the 60-65 ksi (414-448 MPa) range are attained. Also, tensile testing of 230-W® filler metal weld deposits determined the yield strength to be in the 68-78 ksi (469-538 MPa) range. Thus, high tungsten of 14% along with 3% molybdenum in a nickel matrix without niobium and titanium additions does not produce the high weld deposit yield strengths of the inventive welding filler metal. The 3.0-5.0% niobium and 1.2-3.0% titanium in the inventive welding filler metal coupled with low iron in the welding filler metal and low iron dilution from the welding process produce yield strengths on the order of 72-92 ksi (496-634 MPa). Also, when heat input of the welding process is controlled to lower values with low iron in the filler metal and low iron dilution in the weld, it is believed that yield strengths on the order of 83-95 ksi (572-655 MPa) can be produced.

Prior art welding filler metals have focused on the control of second phases by heat treatment; however, since the precipitation and control devices for the inventive welding filler metal are in effect from melting through solidification and cool-down, the inventive filler metal can be used in the as-welded condition to achieve high speed fabrication along with high weld deposit strength.

Commercially available certified 4" diameter INC-ONEL® alloy 625 ID clad X-65 pipe was obtained for testing of the inventive welding filler metal. Mechanical testing of unwelded samples of the pipe determine the yield strength to be 87.2 ksi (601 MPa) (average of four tests, Table 6). Based on the mechanical properties, this lot of pipe could have been double or triple qualified as X-65, X-70, and X-80 pipe. Table 7 gives the composition of this lot of pipe. Since this pipe could have been double or triple qualified as X-65, X-70, or X-80 pipe, the typical compositions of X-70 and X-80 pipe would be similar with slightly higher Mn, around 1.5-1.7%.

TABLE 6

Mechanical Properties of Unwelded X-65 Pipe

| Sample I.D. | 0.2% Yield Strength | | Ultimate Tensile Strength | | Elongation (%) | Reduction of Area (%) | Hardness (HRB) |
| --- | --- | --- | --- | --- | --- | --- | --- |
| | ksi | MPa | ksi | MPa | | | |
| 1 | 87.7 | 605 | 101.7 | 701 | 27.0 | 77.0 | 95.8 |
| 2 | 87.2 | 601 | 100.9 | 696 | 28.3 | 77.2 | 95.5 |
| 3 | 86.5 | 596 | 100.8 | 695 | 25.8 | 77.6 | 95.3 |
| 4 | 87.4 | 603 | 101.5 | 700 | 25.1 | 76.8 | 96.1 |
| Average | 87.2 | 601 | 101.2 | 698 | 26.6 | 77.2 | 95.7 |

TABLE 7

Composition of X-65 Pipe Used to Make the Experimental Welds

| Fe | C | Mn | Si | Cr | Mo | Cu | Al | Nb | V |
| --- | --- | --- | --- | --- | --- | --- | --- | --- | --- |
| balance | 0.11 | 1.25 | 0.31 | 0.10 | 0.20 | 0.14 | 0.04 | 0.04 | 0.05 |

Figure 2:
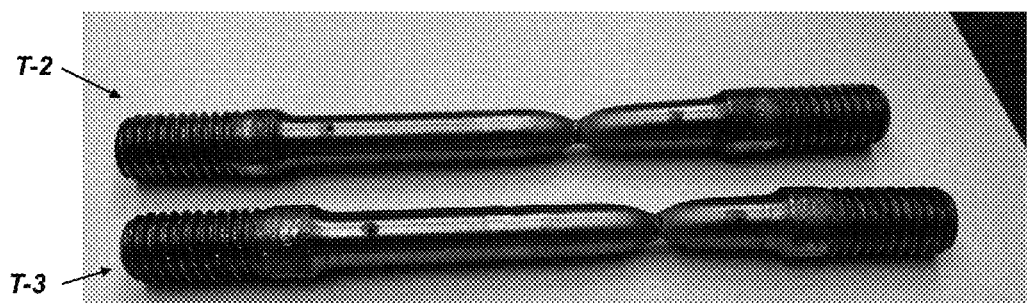
FIG. 2 is a photograph of samples of X-65 pipe welded with the inventive welding filler metal HV1654 after tensile testing.

Circumferential groove welds were produced in the X-65 pipe using inventive welding filler metals HV1654, HV1655, and HV1708 using the GTAW process with low Fe dilution techniques in which only enough of the sidewalls were melted to obtain fusion with very little penetration into the sidewalls. Transverse tensile tests were performed on the welded pipes. Both T-2 and T-3 specimens were prepared and tested. Table 8 shows the transverse tensile results for the welded pipes made with the HV1654 welding filler metal and shows that all of the specimens failed in the base metal away from the heat affected zone (HAZ) and fusion line. FIG. 2 shows two of the specimens after tensile testing. These results indicate that the strength of the welding filler metal HV1654 is greater than 80.9 ksi (558 MPa) when used to weld X-65 pipe. Transverse bend tests were also performed and passed without flaws.

Figure 3:
FIG. 3 is a photograph of samples of X-65 pipe welded with the inventive welding filler metal HV1708 after tensile testing

Table 9 shows the results of transverse tensile tests for the X-65 pipe welded using welding filler metal HV1708. All of the specimens failed in the base metal away from the fusion line and the HAZ. These results indicate that the strength of welding filler metal HV1708 is greater than 86.7 ksi (598 MPa) when used to weld X-65 pipe. FIG. 3 shows the failed tensile specimens.

TABLE 8

Transverse Tensile Properties for INCONEL ® Alloy 625 I.D.
Clad X-65 pipe GTAW Welded with Inventive Welding Filler Metal HV1654

| Sample I.D. | Sample | 0.2% Yield Strength ksi | MPa | Ultimate Tensile Strength ksi | MPa | Elongation (%) | Reduction of Area (%) | Failure Location |
|---|---|---|---|---|---|---|---|---|
| Continuous orbital pipe weld made using a positioner ||||||||||
| 1 | T3 | 72.3 | 499 | 91.5 | 631 | 23.6 | 75.4 | Base Material |
| 2 | T3 | 72.6 | 501 | 91.9 | 634 | 24.8 | 72.6 | Base Material |
| 3 | T2 | 78.7 | 543 | 95.3 | 657 | 22.2 | 76.0 | Base Material |
| 4 | T2 | 76.6 | 528 | 94.1 | 649 | 25.2 | 76.8 | Base Material |
| Manual pipe weld made one quadrant at a time then rotated ||||||||||
| 1 | T3 | 74.1 | 511 | 92.2 | 636 | 23.2 | 75.0 | Base Material |
| 2 | T3 | 73.9 | 510 | 92.8 | 640 | 23.8 | 75.4 | Base Material |
| 3 | T2 | 80.9 | 558 | 98.1 | 676 | 21.6 | 74.4 | Base Material |
| 4 | T2 | 77.6 | 535 | 94.8 | 654 | 19.9 | 75.1 | Base Material |

TABLE 9

Transverse Tensile Properties for INCONEL ® Alloy 625 I.D.
Clad X-65 pipe GTAW Welded with Inventive Welding Filler Metal HV1708

| Sample I.D. | 0.2% Yield Strength ksi | MPa | Ultimate Tensile Strength ksi | MPa | Elongation (%) | Reduction of Area (%) | Failure Location |
|---|---|---|---|---|---|---|---|
| 1 | 81.5 | 562 | 98.4 | 678 | 23.2 | 77.7 | Base Material |
| 2 | 86.7 | 598 | 100.1 | 690 | 23.3 | 76.8 | Base Material |
| 3 | 82.7 | 570 | 101.4 | 699 | 21.2 | 72.1 | Base Material |
| 4 | 82.2 | 567 | 99.9 | 689 | 21.5 | 76.6 | Base Material |

Based on the foregoing data, it can be seen that the inventive welding filler metal can be used for joining high strength INCONEL® alloy 625 ID clad X-65, X-70, and X-80 steel pipe and produces acceptable bend tests and tensile tests that fail in the base metal. These weld deposits are stronger than the base metal in the as-welded condition and provide very high toughness in Charpy V notch testing at −50° F. It is unexpected that both high yield strength and toughness are present in the as-welded condition. This combination of properties is produced by a fine dispersion of second phase particles within a matrix of molybdenum and tungsten stiffened nickel and chromium. These particles are precipitated from the melt during solidification and cooldown and provide as-welded properties that have not been achieved with any prior art corrosion-resistant nickel based welding filler metals. Based on the Cr, Mo, and W in the nickel matrix, these weld deposits should exhibit good corrosion resistance that is at least equal to that of INCONEL® alloy 625 weld deposits when tested in ASTM G-48 environments. Crack tip opening displacement (CTOD) results and fatigue resistance should also be good.

The welding filler metal may be supplied in any suitable form including tubular wire and flux cored wire. The solid wires are produced as conventional solid solution nickel alloys, but require relatively high temperature annealing and must be annealed more frequently than other nickel alloys. The process includes conventional vacuum melting, casting of an ingot, which may be remelted, and hot working the ingot to form billets. The billets are then hot-rolled to form wire/rod. The wire/rod is cold drawn to a tensile strength of over 200 ksi (1379 MPa), annealed above 2000° F. (1093° C.), and redrawn to finished sizes. In the annealed condition, the wires may have a tensile strength of 120-140 ksi (827-965 MPa).

The welding filler metal may be used with any suitable welding process, preferably gas metal arc welding (GMAW) or gas tungsten arc welding (GTAW). During the welding process, the welding filler metal will be melted and cooled to form a weld deposit. To reduce welding time and iron dilution of the weld deposit, it is preferred that the included angle of the weld joint be small, 2-5 degrees, often called a narrow groove, and that a vertical down GMAW welding process be used to reduce the heat input and allow for relatively fast travel of the welding process. In addition, if INCONEL® alloy 625 or similar alloy ID clad high strength steels are being welded, the cladding will provide a base (root of the joint already fused) of 3-4 mm of INCONEL® alloy 625 or similar weld metal that will limit the amount of iron dilution to only that coming from the sidewalls of the joint.

The welding filler metal and method described above may be used to produce a weldment comprising at least two high-strength steel components joined by a weld deposit made using the inventive welding filler metal and having the properties described above. Also, as mentioned above the at least two high-strength steel components may be selected from X-65, X-70, or X-80 pipes that may have ID cladding of INCONEL® alloy 625.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:
1. A welding filler metal comprising, in weight percent: 17.0 to 23.0% chromium, 5.0 to 12.0% molybdenum, 3.0 to 11.0% tungsten, 3.0 to 5.0% niobium, 0 to 2.0% tantalum,

1.2 to 3.0% titanium, 0.005 to 1.50% aluminum, 0.0005 to 0.100% carbon, less than 2.0% iron, less than 5.0% cobalt, and balance nickel wherein the nickel is 56.0 to 65.0%, and
wherein a weld deposit formed from the welding filler metal has a minimum yield strength in an as-welded condition of at least 72 ksi (496 MPa).

2. The welding filler metal of claim 1 comprising a minimum of 3.5% niobium+tantalum.

3. The welding filler metal of claim 1 comprising a maximum of 6.0% niobium+tantalum.

4. A welding filler metal product comprising, in weight percent: 17.0 to 23.0% chromium, 5.0 to 12.0% molybdenum, 3.0 to 11.0% tungsten, 3.0 to 5.0% niobium, 0 to 2.0% tantalum, 1.2 to 3.0% titanium, 0.005 to 1.50% aluminum, 0.0005 to 0.100% carbon, less than 2.0% iron, less than 5.0% cobalt, and balance nickel wherein the nickel is 56.0 to 65.0%, and
wherein a weld deposit formed from the welding filler metal product has a minimum yield strength in an as-welded condition of at least 72 ksi (496 MPa).

5. The welding filler metal product of claim 4 comprising a minimum of 3.5% niobium+tantalum.

6. The welding filler metal product of claim 4 comprising a maximum of 6.0% niobium+tantalum.

7. The welding filler metal product of claim 4, wherein the product is in the form of a tubular wire or a flux-cored wire.

8. A weld deposit comprising, in weight percent: 17.0 to 23.0% chromium, 5.0 to 12.0% molybdenum, 3.0 to 11.0% tungsten, 3.0 to 5.0% niobium, 0 to 2.0% tantalum, 1.2 to 3.0% titanium, 0.005 to 1.50% aluminum, 0.0005 to 0.100% carbon, less than 8.0% iron, less than 5.0% cobalt, and balance nickel wherein the nickel is 56.0 to 65.0%, and
wherein the weld deposit has a minimum yield strength in an as-welded condition of at least 72 ksi (496 MPa).

9. The weld deposit of claim 8 comprising a minimum of 3.5% niobium+tantalum.

10. The weld deposit of claim 8 comprising a maximum of 6.0% niobium+tantalum.

11. The weld deposit of claim 8 comprising a microstructure including finely dispersed second phase particles.

12. The weld deposit of claim 11, wherein the second phase particles are less than 5 μm.

13. The weld deposit of claim 8, wherein elongation of the weld deposit is at least 20%.

14. The weld deposit of claim 8, wherein toughness of the weld deposit is at least 50 J at −50° F.

15. A weldment comprising:
at least two high-strength steel components, each of the components individually having a minimum yield strength of 65 ksi (448 MPa) connected by a weld deposit comprising, in weight percent, 56.0 to 65.0% nickel, 17.0 to 23.0% chromium, 5.0 to 12.0% molybdenum, 3.0 to 11.0% tungsten, 3.0 to 5.0% niobium, 0 to 2.0% tantalum, 1.2 to 3.0% titanium, 0.005 to 1.50% aluminum, 0.0005 to 0.100% carbon, less than 8.0% iron, and less than 5.0% cobalt and having a minimum yield strength in an as-welded condition of at least 72 ksi (496 MPa).

16. A method of producing a weld deposit comprising:
providing a welding filler metal comprising, in weight percent, 56.0 to 65.0% nickel, 17.0 to 23.0% chromium, 5.0 to 12.0% molybdenum, 3.0 to 11.0% tungsten, 3.0 to 5.0% niobium, 0 to 2.0% tantalum, 1.2 to 3.0% titanium, 0.005 to 1.50% aluminum, 0.0005 to 0.100% carbon, less than 2.0% iron, and less than 5.0% cobalt;
melting and cooling the welding filler metal to create a weld deposit; and
limiting iron dilution of the weld deposit during melting and cooling such that an as-welded weld deposit contains less than 8% iron,
wherein the weld deposit has a minimum yield strength in the as-welded condition of at least 72 ksi (496 MPa).

17. The method of claim 16, wherein the melting and cooling of the welding filler metal is accomplished by gas metal arc welding (GMAW).

18. The method of claim 17, wherein the welding filler metal is melted and cooled in a narrow groove joint between two steel components wherein the narrow groove joint has an included angle of 2-5 degrees.

19. The method of claim 17, wherein the welding filler metal is melted and cooled in a narrow groove joint between two steel components wherein the steel components are clad on at least one side with a nickel alloy.

* * * * *